(12) United States Patent
Beaudet et al.

(10) Patent No.: US 11,861,877 B2
(45) Date of Patent: Jan. 2, 2024

(54) SYSTEM AND METHOD FOR IDENTIFYING A MACHINE TOOL HAVING PROCESSED A WOOD PIECE

(71) Applicant: Bid Group Technologies Ltd., Prince George (CA)

(72) Inventors: Gabriel Beaudet, Levis (CA); Francis Clement, Blainville (CA); Alexandre Prevost, Ottawa (CA); Guy Morissette, Lorraine (CA)

(73) Assignee: BID GROUP TECHNOLOGIES LTD, Prince George (CA)

( * ) Notice: Subject to any disclaimer, the term of this patent is extended or adjusted under 35 U.S.C. 154(b) by 473 days.

(21) Appl. No.: 17/196,730

(22) Filed: Mar. 9, 2021

(65) Prior Publication Data
US 2021/0279850 A1 Sep. 9, 2021

Related U.S. Application Data (60) Provisional application No. 62/986,927, filed on Mar. 9, 2020.

(51) Int. Cl.
| | |
|---|---|
| *G06V 10/44* | (2022.01) |
| *G06T 7/00* | (2017.01) |
| *G06T 7/40* | (2017.01) |
| *G06T 7/73* | (2017.01) |
| *G06T 7/11* | (2017.01) |
| *G06V 10/764* | (2022.01) |

(52) U.S. Cl.
CPC ............ *G06V 10/44* (2022.01); *G06T 7/001* (2013.01); *G06T 7/11* (2017.01); *G06T 7/40* (2013.01); *G06T 7/73* (2017.01); *G06V 10/764* (2022.01); *G06T 2207/20076* (2013.01); *G06T 2207/20081* (2013.01); *G06T 2207/30161* (2013.01)

(58) Field of Classification Search
CPC .. G06V 10/44; G06V 10/764; G06V 2201/06; G06T 7/001; G06T 7/11; G06T 7/40; G06T 7/73; G06T 2207/20076; G06T 2207/20081; G06T 2207/30161; G06F 18/2431
See application file for complete search history.

(56) References Cited

U.S. PATENT DOCUMENTS

| | | |
|---|---|---|
| 7,426,422 B2 | 9/2008 | Carman et al. |
| 8,346,631 B2 | 1/2013 | Barker |

(Continued)

OTHER PUBLICATIONS

He, Ting, et al. "Application of deep convolutional neural network on feature extraction and detection of wood defects." Measurement 152: 107357. Available online Dec. 5, 2019. (Year: 2019).*

*Primary Examiner* — Bobbak Safaipour
(74) *Attorney, Agent, or Firm* — Brouillette Legal Inc.; Robert Brouillette (57) ABSTRACT

A system and method for detecting the origin of wooden planks in a sawmill is provided. The method scans surfaces of processed planks and, with the help of an AI algorithm comprising a deep-learning algorithm, determines the origin of said planks based on analysed parameters of the planks. The parameters used in the analysis are mainly properties of tool marks and the resulting analysis provides tools and equipment used. The deep learning algorithm may be in a self-learning mode or in a supervised training mode.

23 Claims, 8 Drawing Sheets

(56) References Cited

U.S. PATENT DOCUMENTS

| | | | |
|---|---|---|---|
| 11,141,875 B1* | 10/2021 | Weinschenk | B27B 25/00 |
| 11,348,269 B1* | 5/2022 | Ebrahimi Afrouzi | G01S 17/48 |
| 2005/0013472 A1* | 1/2005 | Gauthier | G05B 19/4183 |
| | | | 382/110 |
| 2018/0311860 A1* | 11/2018 | Strasky | G05B 19/4097 |
| 2019/0018389 A1* | 1/2019 | Schmeringa | B26D 5/00 |
| 2019/0283266 A1 | 9/2019 | Ursella et al. | |
| 2019/0308260 A1* | 10/2019 | Laliberte | B23D 59/001 |
| 2022/0065841 A1* | 3/2022 | Clement | G06F 18/217 |
| 2023/0024974 A1* | 1/2023 | Rendahl | G06V 20/52 |

* cited by examiner

| Upper Face Output | Down Face Output | Equipment | Positioning |
|---|---|---|---|
| | | Board's origin | |
| Fig. 4A (Circular center/shaft side) | Fig. 4C | OLI | Right side |
| Fig. 4B (Circular center/shaft bottom side) | Fig. 4C | OLI | Left side |
| Fig. 4D | FIG. 4 E (Circular center/shaft side) | TBL | Left side |
| Fig. 4D | FIG. 4 F (Circular center/shaft upper side) | TBL | Right side |
| FIG. 4 E (Circular center/shaft bottom side) | FIG. 4 E (Circular center/shaft bottom side) | TBL | Center |

FIG. 6

SYSTEM AND METHOD FOR IDENTIFYING A MACHINE TOOL HAVING PROCESSED A WOOD PIECE

CROSS-REFERENCE TO RELATED APPLICATIONS

The present patent application claims the benefits of priority of U.S. Provisional Patent Application No. 62/986,927, entitled "DETECTION OF THE ORIGIN OF WOODEN PLANKS" and filed at the United States Patent and Trademark Office on Mar. 9, 2020, the content of which is incorporated herein by reference.

FIELD OF THE INVENTION

The present invention generally relates to systems and methods of identifying a machine tool having performed operations on a wood piece, such as a wooden plank. More specifically, the present invention relates to methods analyzing marks left by a tool on a wood piece to identify a specific tool amongst a plurality of tools in a production line.

BACKGROUND OF THE INVENTION

Sawmills generally make use of automated processes or production lines to process a large volume of logs. The processing may include transforming received logs into various types of shapes, such as standard planks. The production lines typically connect multiple tools or machines in parallel or in series, each tool or machine executing one or more operations on the conveyed logs. The end results generally depend on the quality of work provided by each tool or machine. Then, processed logs generally undergo through a quality control including test or inspection steps to detect any anomalies which might have occurred during the process.

The quality control is generally performed by experienced professionals through a statistical analysis, thus validating the quality of only a portion of the processed logs. Understandably, as such method is human based, defects may be missed or there might be a delay in detecting the said defects, thus reducing the overall quality of the processed logs. Furthermore, even for experienced professional, some defects may be difficult to link with a specific malfunctioning tool or machine when multiple tools or operations are involved.

US Patent Application no. US 2019/0283266 A1 and in U.S. Pat. No. 8,346,631 B2 disclose methods to analyse processed pieces of wood from a log to determine from which log the pieces originate. Such methods require multiple scans of both the logs and of the processed pieces. The said methods do not provide any information regarding the production path or tools and equipment which processed the said logs. Understandably, these methods are less than ideal for locating precise problematic points in assembly lines used for the processing of logs.

There is thus a need for a method and a system using a method to automatically identify a machine tool and/or equipment to have performed an operation on a log through an analysis of one or more marks left of the resulting planks from the processed log.

SUMMARY OF THE INVENTION

The aforesaid and other objectives of the present invention are realized by generally providing a system for identifying a machine tool having processed a wood piece comprising tool marks in a production line, the system comprising a computerized device executing a program; and an information capturing device in communication with the computerized device, the information gathering device having access to wood pieces in the production line and being configured to capture quantifiable and/or qualitative characteristics of the wood pieces of the production line and to communicate the said captured characteristics to the computerized device, the program being configured to detect marks or patterns on a surface of the wood piece based on the received quantifiable and/or qualitative information and identify a machine tool of the production line having processed the wood piece based on the captured quantifiable and/or qualitative characteristics.

The program may be trained to detect marks or patterns on a wood piece, such being trained using an artificial intelligence framework or algorithm. The program may be trained using an artificial intelligence algorithm. The artificial intelligence algorithm may use unsupervised training or supervised training having predetermined categories of characteristics to analyse.

The information gathering device may be selected in one of the followings: a scanner, a laser, a camera, and a thermometer.

The identification of the machine tool of the production line having processed the wood piece may be based on a single capture of the quantifiable and/or qualitative characteristics of the wood pieces.

The program may be further configured to identify one or more irregularities of the detected marks or patterns, the irregularities being quantifiable and/or qualitative values of characteristics within a predetermined range of values.

In another embodiment of the invention, a computer-implemented method for identifying a machine tool or equipment having processed a wood piece in a production line is provided. The method comprises scanning at least one surface of the wood piece, processing each of the scanned surface to identify marks, signs and/or traits present on the at least one scanned face of the wooden piece, analyzing characteristics of the processed marks, signs and/or traits; and mapping the machine tool or equipment used to process the marks, signs and/or traits based on the analyzed characteristics.

The method may comprise scanning the at least one surface comprising capturing one or more images and/or geometrical data of one or more faces of the wooden piece. The method may further comprise categorizing the marks, signs or traits in predetermined categories, the mapping of the machine tool and equipment being based on the categorized marks, signs, or traits. The mapping of the machine tool and equipment may be further based on the categorized marks, signs or traits being located on the right, left, top or bottom of a central point. The method may further comprise training a trained artificial intelligence algorithm to categorize the processed marks based on the characteristics of the processed marks. The method may further comprise training the artificial intelligence algorithm using wood pieced having predefined marks signs or traits. In another aspect, the training is using an unsupervised mode. The training may use a supervised mode. The supervised artificial mode may comprise using an identification table comprising machine tool or equipment information and associated predetermined marks, signs, or traits. The method may further comprise updating the identification table during the training of the artificial intelligence algorithm.

The method may further comprise calculating a matching probability between the analyzed characteristics and a list of machine tools or equipment present in the production line, comparing the calculated matching probability to a predetermined level and mapping a machine tool or equipment to the wood piece when the calculated matching probability is equal or higher than the predetermined level. The scanning of the surface may capture any one of the followings: geometrical data, color data, scalar data, information about the edges of the wood piece and thermographic data. The analyzed characteristics may comprise any one of the followings: level of curvature, width, depth and length of the mark, sign or trait, distance between different marks, signs or traits and variation of the said identified characteristics. The processed marks, signs or traits may originate from any one of the followings: a band saw, a conic canter pattern, a cylindrical canter pattern, a circular saw, or any combination thereof. The method may comprise scanning two different wood pieces and matching the two different wood pieces as having been processed by a common machine tool or equipment of the production line.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel system and method for identifying a machine tool having processed a wood piece will be described hereinafter. Although the invention is described in terms of specific illustrative embodiment(s), it is to be understood that the embodiment(s) described herein are by way of example only and that the scope of the invention is not intended to be limited thereby.

Figure 1:
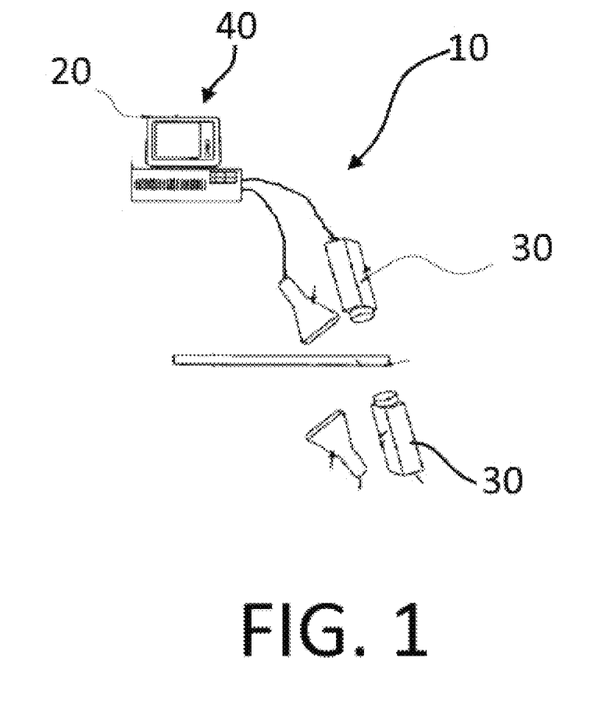
FIG. 1 is an illustration of a system for identifying a machine tool having processed a wood piece in accordance with the principles of the present invention.

Referring to FIG. 1, an embodiment of a system for identifying a machine tool having processed a wood piece 10 is shown. The exemplary system 10 comprises a computerized device 20 connected to information gathering systems or devices 30, such as but not limited to laser, scanner, camera or any other detection sensor or device. The computerized device 20 may be embodied as a computer, a server, a controller, or any device comprising a central processor unit (CPU), one or more graphics processing unit (GPU) or any other processing unit known in the art. The information gathering systems or devices 30 may be embodied as, but not limited to a scanner, a laser, a camera, a thermometer or any other detection sensor or device. In an embodiment of the invention, only one scanner 30 is comprised in the system 10. The information gathering devices 30 configured to scan at least a surface of a wood piece, such as but not limited to a plank. The information gathering is in communication with the computerized device 20 and may send and/or receive information to said computer 20 using any known communication system or protocol.

In some embodiments, the information gathering devices 30 are used to gather quantifiable and/or qualitative information about each processed wood piece. Accordingly, the type of gathered information may generally be any visual detail and/or geometrical data, such as but not limited to depth, with, length and general shape. In a preferred embodiment, the information gathering devices 30 are positioned at the end of the production line or at a step of the production line where the tools and/or equipment having processed the wood pieces or planks being conveyed are to be determined. The identification of the tools and/or equipment having processed the planks are generally performed in a single iteration, thus typically by executing a single scanning process.

The computerized device 20 typically comprises a CPU and/or at least one GPU, transient and/or non-transient memory, input/output ports, etc. The computerized device 20 is configured to execute instructions of one or more programs 40 and to receive data from the gathering information devices 30. The program 40 is configured to use the data from the gathering information devices 30 to detect marks or signs on one or more faces of the processed wood piece, to associate a type or a geometric shape to each detected mark or sign and to automatically identify which tool or machine of the production line was used to create the detected mark or sign.

In some embodiments, the program 40 is configured to make use of artificial intelligence (also referred as "AI") functions and/or algorithms. In such embodiments, the program 40 is configured to be trained to associate marks or signs present on the wooden piece to operations of a specific machine or a specific tool of a machine based on the information received by the gathering information devices 30. In yet other embodiments, the program 40 may be configured to be executed on any standard sawmill or production line optimizer instead of being executed by the computerized device 20 as described above.

Figure 2:
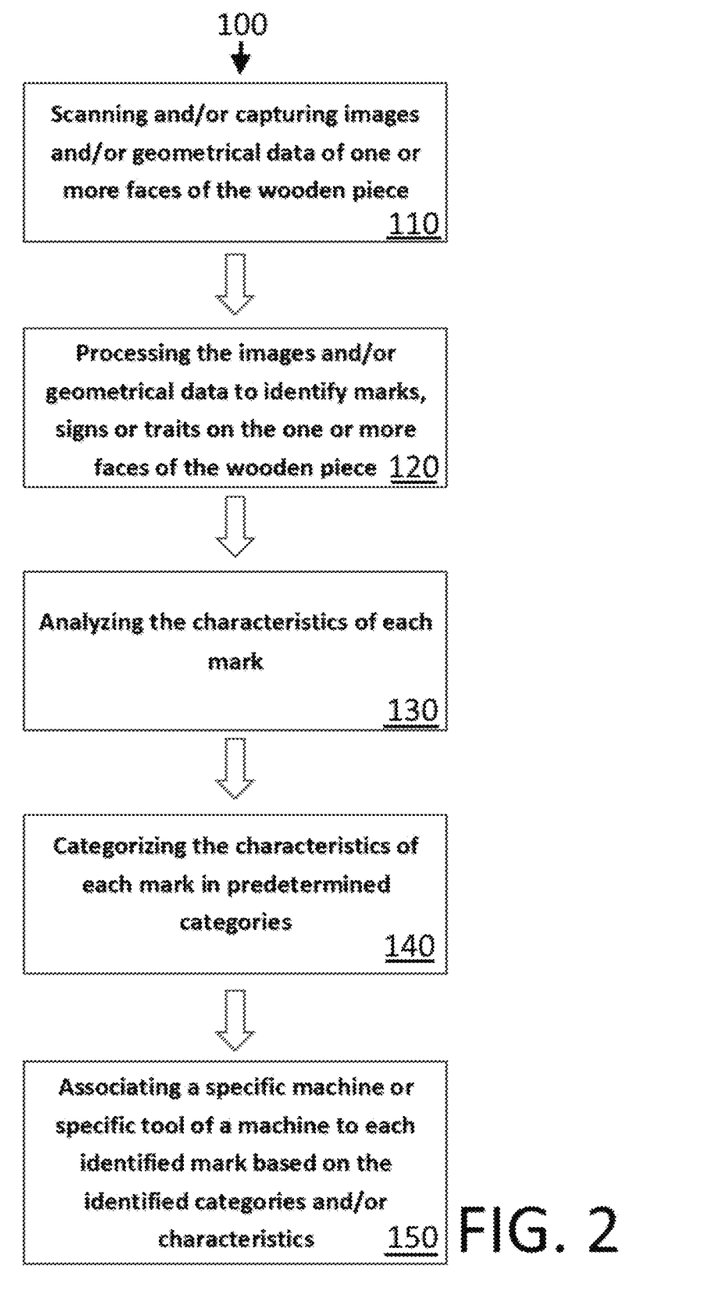
FIG. 2 is a workflow diagram of a method identifying a machine tool having processed a wood piece in accordance with the principles of the present invention.

Referring now to FIG. 2, a method for identifying a machine tool having processed a wood piece 100 is shown. The method 100 comprises scanning one or more face of the wooden piece and/or capturing one or more images and/or geometrical data of one or more faces of the analyzed wooden piece 110. The method 100 further comprises processing each of the captured images or the geometrical data to identify marks, signs or traits present on a least one face of the wooden piece 120. The method 100 further comprises analyzing the characteristics of each mark 130 and may further comprise categorizing the said characteristics 140 in predetermined categories or in categories to be determined by the program 40. The method 100 further comprises associating a specific machine or specific tool of a machine to the identified mark based on the identified categories and/or characteristics of the wooden piece 150. Understandably, the steps of processing the capture images 120, of analyzing the characteristics of each marks 130 and/or categorizing the said characteristics 140 may be performed using an AI framework or an AI algorithm as described herein below.

The step to scan the wood 110 piece may comprise capturing a digital representation as an image and/or videos and/or may comprise geometrical data, such as coordinates of the scanned surfaces, edges of the wood piece, and/or thermographic data. Understandably, any type of data which may be captured using known sensors may be used within the scope of the present invention.

In some embodiments, the processing of each of the captured images or the geometrical data to identify marks 120 may further comprise executing an artificial intelligence algorithm trained to detect marks, signs and/or traits of tools used on the wood piece in an image of a surface of the said wood piece. Understandably, such AI algorithm may be trained using training method known in the art such as human-based confirmation methods.

In yet other embodiments, the analyzing of the characteristics of each mark 130 may further comprise executing an AI algorithm trained to identify characteristics of the detected marks, signs and/or traits used on the wood piece in an image of a surface of the said wood piece. The identified characteristics of the mark may be the level of curvature, the width, depth and/or length of the mark, the distance between different marks, the variation of the said identified characteristics over time or any other characteristics that may be identified by a human or by the AI algorithm.

The step to associate a categorized mark with one or more specific machines or specific tools may further comprise using an unsupervised AI algorithm to determine the categories and/or characteristics of the different wood pieces. In other embodiments, the step may use a supervised AI algorithm having predetermined categories.

Figure 6:
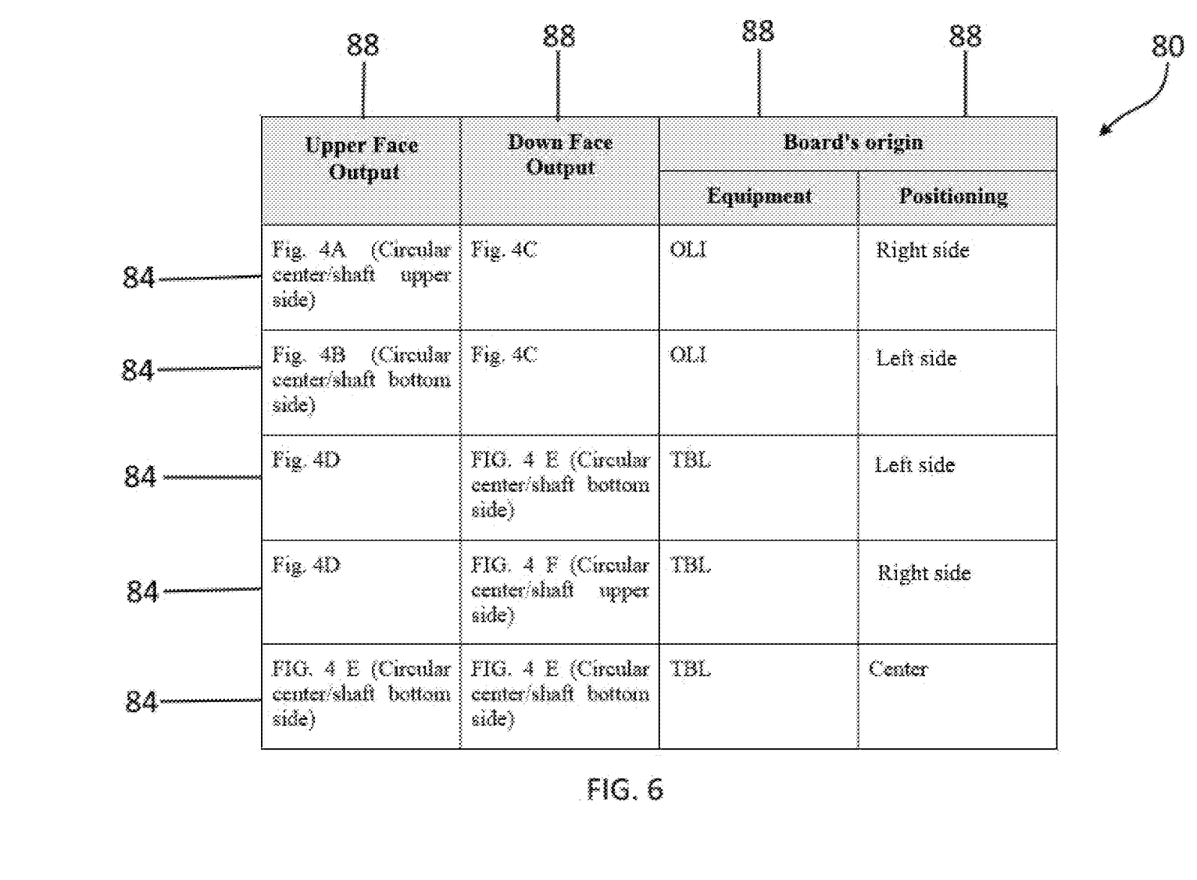
FIG. 6 is an exemplary identification table for identifying tools and/or equipment used for the processing of a scanned wood plank in accordance with the principles of the present invention.

The step to associate a specific machine or specific tool of a machine to the identified mark 150 may further use an identification table. The identification table preferably comprises records having the identification of the equipment, the position of the equipment in the production line. The identification table further comprises the output data of each of the faces of the wood piece after being processed, such as the characteristics and/or categories associated to the outputted face. An exemplary identification table is shown in FIG. 6 and is described thereafter.

Broadly, to associate the specific machine or tool of a machine to a detected mark, the characteristics and/or categories associated to the detected mark are looked in the identification table to find a matching machine. The method 100 may further comprise identifying a machine by deduction. Thus, if a first tool is matching to a first scanned face of the wood piece and a second tool is matching to a second scanned face, the method 100 may comprise the step to deduct that the wood piece was processed by a specific machine as the machine is associated with the first and the second matching tools.

In some embodiment, the method 100 comprises calculating the matching probabilities. In such embodiment, the method 100 comprises comparing the matching probabilities to a predetermined level of comfort or acceptance.

Understandably, more than one machine may be associated to a processed wood piece. In such event, the path or portions of the path followed by the wood pieced during the production process may be identified. As such, the specific machines or tools having performed operations on the wood pieces are identified.

In some embodiments, the method 100 further comprises detecting irregularities in marks or patterns on a surface of a wood piece. The detected irregularities may be quantifiable and/or be qualitative characteristics being outside of acceptable error margins or ranges.

As such, the machine may comprise any type of wood processing machines or tools, which may include cutting machines, such as but not limited to, saw machine, trimmer, reducer, sandblasting tools, router, circular saws, linear saws (bandsaws), cylindrical canters, conic canters, profiling heads, planer knives, 12 etc., or any combinations thereof.

Understandably, scanning a plurality of surfaces of a plank or wood pieces increases the precision of the identification process. In a preferred embodiment, at least two surfaces of a plank are scanned, typically the top surface and the back surface. It may be appreciated that the method 100 does not require a preliminary scan of a log to efficiently determine the origin of a processed wooden piece. In some embodiments, multiple analysed wooden pieces may originate from various different logs and may yet be identified to have been processed by the same equipment or tool. The time taken to identify a problem in a log processing line may thus be reduced compared to other prior art methods as defective tools and equipment may directly be identified by the method.

Figure 3:
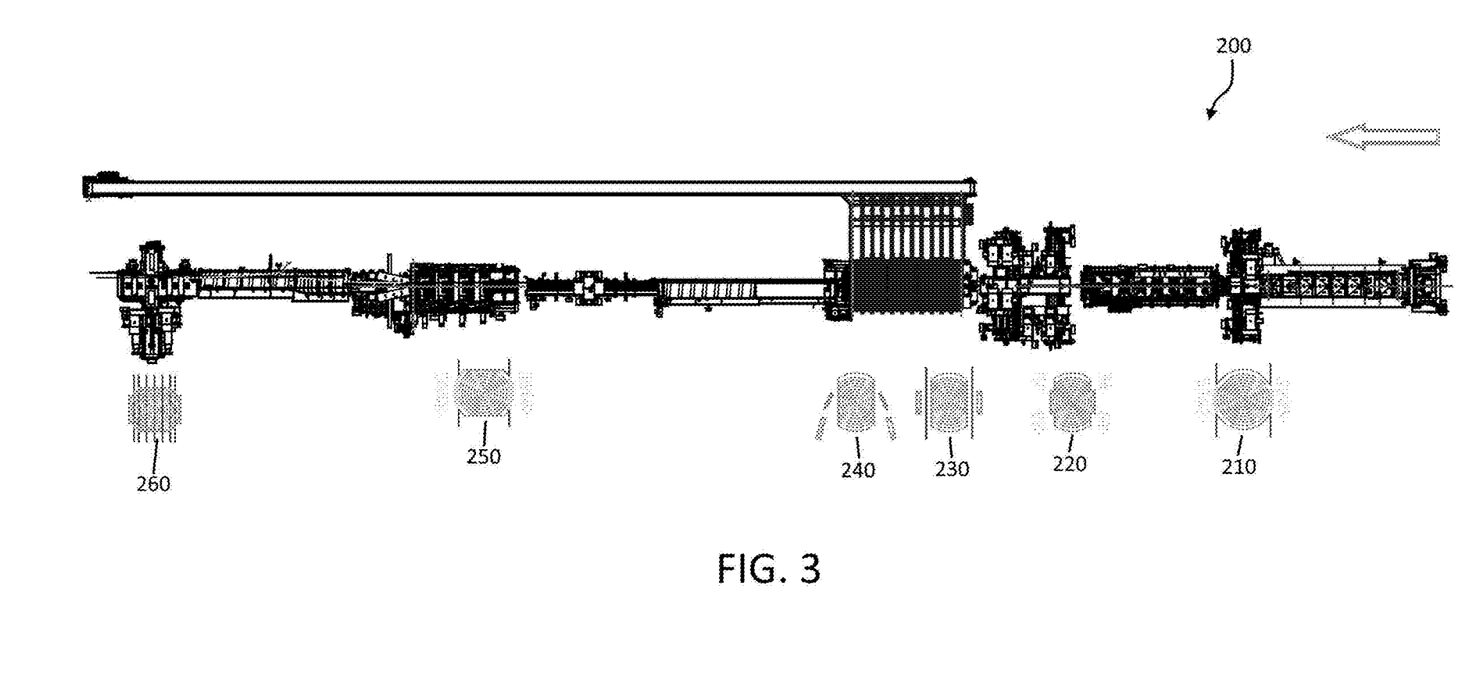
FIG. 3 is an illustration of exemplary shaped of processed wood pieces at different steps of an automated production line for processing a wood piece.

Referring now to FIG. 3, an exemplary process 200 for transforming a log into a plurality of planks is shown. The exemplary process generally involves a plurality of machines and/or tools used to process a log into a plurality of planks. As a non-limiting example, the process 200 may comprise using a chipper canter tool 210, such as a conic canter tool, profiling the log 220, sawing the log, typically using thin or band saws 230, splitting or separating the log 240, chipping using a cylindrical canter tool 250 and splitting the log 260 into a plurality of planks, such as using circular saws. After one or more of the steps are performed, the outputted plank may have marks and/or properties due to the actions performed by the machine, tools and/or combination of machines and tools used.

Figure 4A:
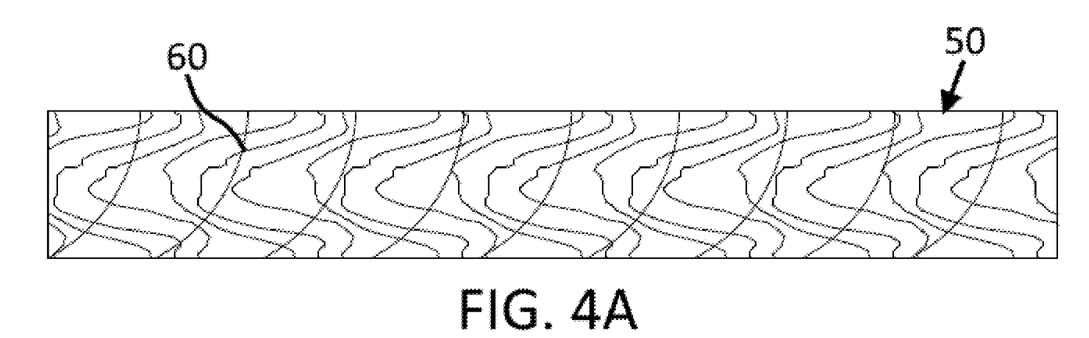
FIG. 4A is an illustration of exemplary rounded mark left by a tool over a surface of a wooden plank.
Figure 4B:
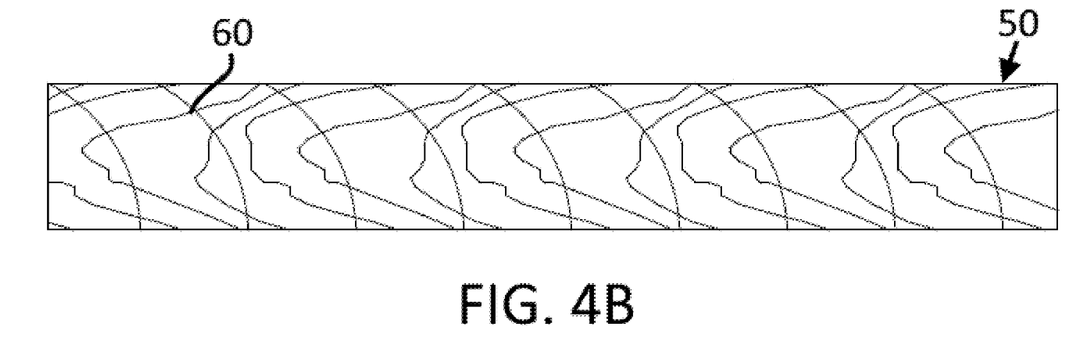
FIG. 4B is an illustration of second exemplary rounded marks left by a tool over a surface of a wooden plank.
Figure 4C:
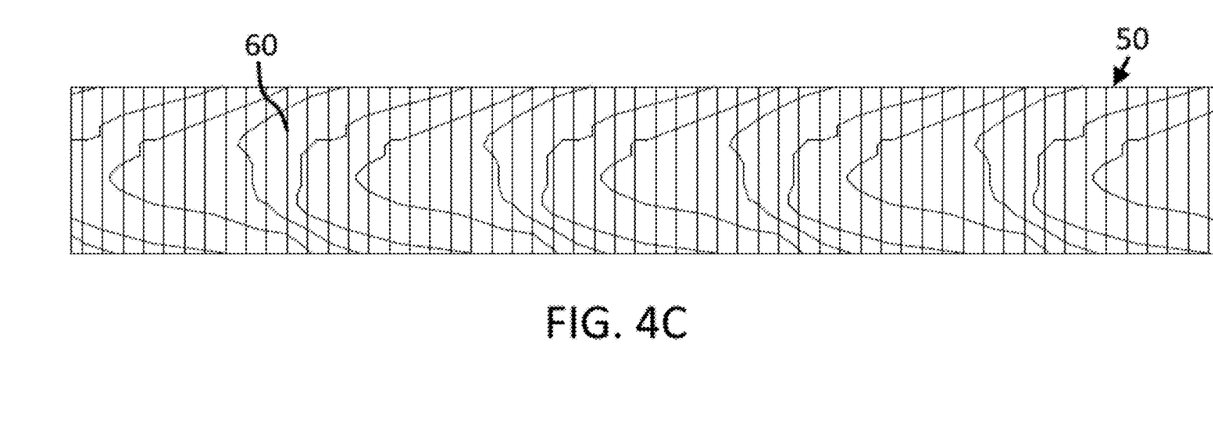
FIG. 4C is an illustration of third exemplary linear marks left by a tool over a surface of a wooden plank.
Figure 4D:
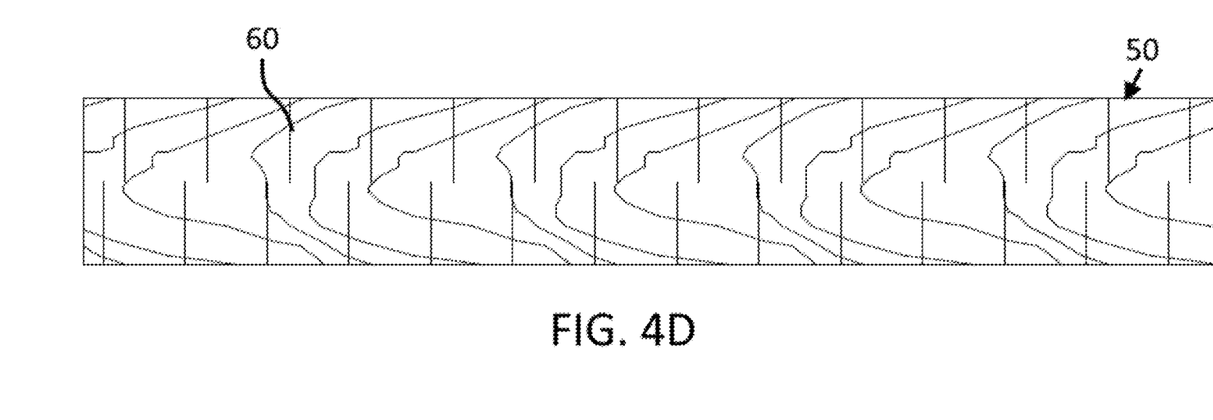
FIG. 4D is an illustration of fourth exemplary linear marks left by a tool over a surface of a wooden plank.
Figure 4E:
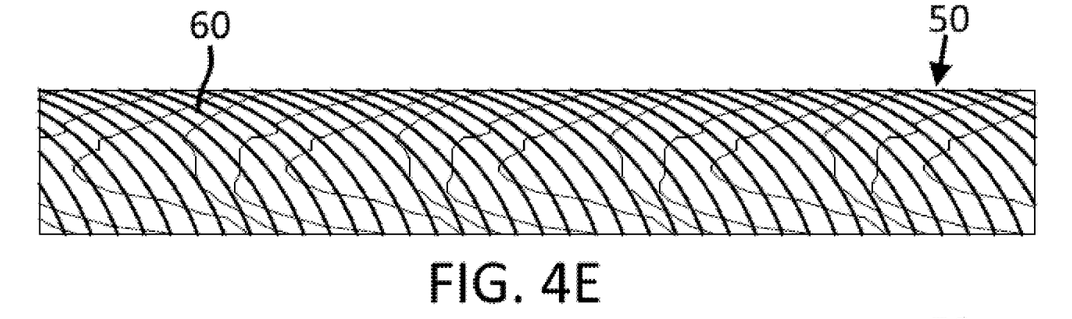
FIG. 4E is an illustration of fifth exemplary curved marks left by a tool over a surface of a wooden plank.
Figure 4F:
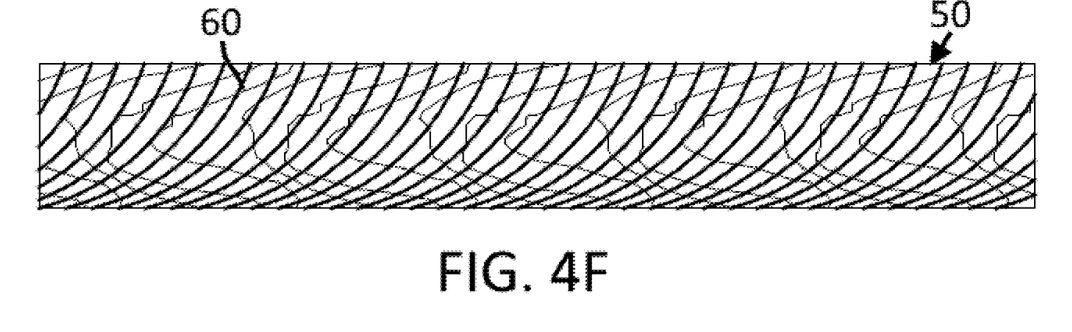
FIG. 4F is an illustration of sixth exemplary curved and linear marks left tool over a surface of a wooden plank.

Now referring to FIGS. 4A to 4F, illustrations of exemplary plank surfaces 50 comprising tool marks 60 are shown. The illustrations of FIGS. 4A and 4B are illustrating tool marks 60 which may typically be performed by a conic canter pattern, also referred to as chipper canter. The illustration of FIG. 4C is illustrating tool marks 60 which may typically be caused by a band saw. The illustration of FIG. 4D is illustrating tool marks 60 which may typically be caused by a cylindrical canter pattern. The illustrations of FIGS. 4E and 4F are illustrating tool marks 60 which may typically be caused by a circular saw. Understandably and based on the above-mentioned figures, each tool may create tool marks 60 which are different from tool marks 60 caused by other tools. The equipment used that controls the movement and/or position of the tools is yet another factor which may provide different tool marks 60.

Referring back to FIGS. 4A and 4B, exemplary wooden boards 50 having marks 60 of a typical chipper canter are shown. In such specific example, the program 40 may detect as the characteristics of the mark 60 the radius of curvature, the length, the direction of curb of the mark 60. The program 40 may further detect that the board 50 of FIG. 4A is from a certain side of a log wherein the board 50 of FIG. 4B is from another side of the log due to the direction of the marks 60.

The position of a cutting pattern 60 may further indicate the orientation of a plank 60 on the conveyor, such as the vertical position of a plank 50 relative to a tool used. Given that a saw may comprise a shaft for rotation and that a plank or log 50 may be processed over or under said shaft, the resulting marks 60 may be positioned differently. As such, marks 60 located on the upper or lower side of an analyzed surface may provide information to better identify the origin of a wooden plank 50. Such detected characteristics are used to match with a tool or a machine of the production line.

Referring to FIG. 4C, an exemplary wooden board 50 is shown. The illustrated wooden board has been cut or sawn using a standard profiler head 220. In such specific example, the analysis of the characteristics of each mark 130 detects that the marks 60 are substantially perpendicular to length of the board 50 and that such marks 60 are substantially rectilinear. Further characteristic may be the number of consecutive similar marks present on the board 50 face. Such characteristics are typically determined by the program 40 using artificial intelligence techniques, such as using deep learning algorithm or neural networks.

Referring now to FIGS. 4E and 4F, an exemplary wooden board 50 having marks 60 of a typical circular saw is shown. In such specific example, the program 40 may detect as one of the characteristics the direction of rotation of the circular saw.

A plank surface may further comprise more than one type of tool marks 60. Combining the more than one tool marks 60 of a given surface in the analysis may provide more efficient results since more parameters may be used to pinpoint the tools and equipment used.

Understandably, given that similar tools or machines may cut planks at different steps of the standardized process and that the positioning of the tools relative to the processed planks may not be the same at each step, analysing the direction of the tool marks may provide clarification as to which tool and equipment caused each mark.

Figure 5A:
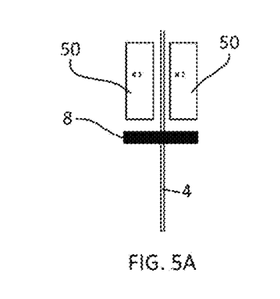
FIG. 5A is an illustration of two exemplary planks being cut by the same tool and/or equipment.
Figure 5B:
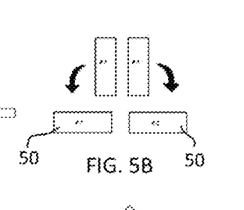
FIG. 5B is an illustration of the two exemplary plank of FIG. 5A being oriented after being cut by the same tool and/or equipment.
Figure 5C:
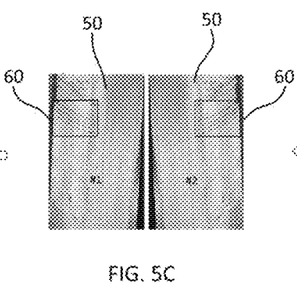
FIG. 5C is an illustration of scanned images of the two exemplary planks, each having marks left by the cutting tool and/or equipment.
Figure 5D:
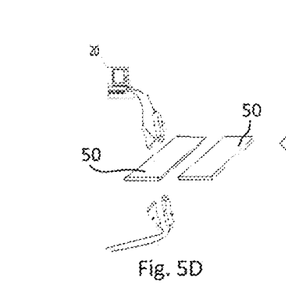
FIG. 5D is an illustration of an embodiment of a system for identifying the tool and/or equipment having processed the two exemplary plank surfaces of FIG. 5C in accordance with the principles of the present invention.

Referring now to FIGS. 5A to 5F, an exemplary process of cutting a wood piece into two in shown. In such process, the wood piece may be cut by a tool 4, such as a circular saw, in two or more pieces, such as pieces #1 and #2 of FIG. 5A. The tool may further comprise a shaft 8 and may thus process wood pieces over and under said shaft 8. As shown in FIG. 5B, after being sawn, the pieces #1 and #2 fall on the conveyor, not shown, or any other moving mechanism toward the step of the process. When falling on the conveyor, the pieces may be in one or another direction as seen in FIG. 5C, thus complexifying the detection of the marks as such marks may now be reversed. One or more surfaces of the resulting pieces are then scanned by a sensor as seen in FIG. 5D. The scanned surfaces may therefore have similar marks. However, such marks may have differing directions or orientation. Furthermore, the position of the mark in relation to the center 34 of a scanning area may also differs from one plank to another coming from the same original log or wood piece.

Figure 5E:
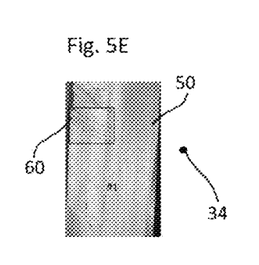
FIG. 5E is an exemplary scanned image of an exemplary plank having a mark left by a counter-flow side of a rotating tool.
Figure 5F:
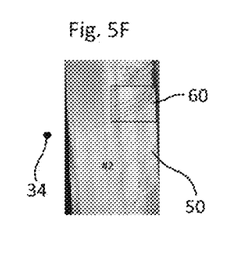
FIG. 5F is an exemplary scanned image of an exemplary plank having a mark left by a flow side of a rotating tool.

Now referring to FIGS. 5E and 5F, the system may be configured to evaluate the positioning of the marks 60, the orientation and/or direction of the marks 60 and the type of marks 60 based on a central point 34 of the conveyor. Using a specific point 34 on the conveyor for the analysis generally aims for an AI algorithm/framework to better isolate the processing location of a plank 50 relative to a tool or equipment used.

In such embodiments, the program 40 is configured to detect the direction of the marks and to identify marks of two different pieces as matching even if the marks are in opposite directions. The program 40 may be further configured to process more than one scanned surface of each piece to match the marks and thus determine the tools and equipment used.

Now referring to FIG. 6, an exemplary identification table 80 is provided. The identification table 80 may comprise exemplary information about a face output, such as upper or down face output. The table 80 may further comprise the equipment and the positioning of the equipment associated with the said output information. The identification table 80 may be used to categorize marks 60 of scanned wood plank surfaces to determine the tools used and the processing location in a wooden log processing assembly. Accordingly, a given type of mark 60 may be associated with certain parameters such as the tool or equipment used, the positioning of a plank relative to the tool when processed and so on. It may be appreciated that the identification table 80 may allow the use of more than one analysed surface of a given plank 50 or for planks 50 having been processed by the same equipment/tool. For example, as illustrated in the table of FIG. 6, each row 84 represents a different analysed plank 50 wherein each column 88 represents the location of analysed marks 60 and the associated equipment and processing location. In the exemplary equipment column 88 of the embodiment of FIG. 6, the term "OLI" refers to equipment used for sawing a log such as, but not limited to, thin or band saws typically associated to the primary breakdown of the processed log. The term "TBL" refers to equipment used for splitting a log with circular saws thus equipment generally associated to the secondary breakdown of the processed log. Understandably, any other terms used for each of the parameters of the table 80 may be used. The categories of an identification table may further be created by users, may be created by an AI algorithm or a combination of both.

In yet other embodiments, other parameters or characteristics may be identified by the program 40 based on the scanned surfaces. As discussed above, such characteristics or categories may be self detected (unsupervised training) or be predetermined (supervised training). For example, the depth of the tool marks may differentiate two similar equipment from one another. The plurality of analysis parameters may further help identify if there are problems with a tool or an equipment by comparing the tool marks of a plank against marks which shall be expected by the said machines.

In another embodiment, the program 40 is programmed to detect predetermined conditions or parameters associated with specific characteristics from data of the peripheral devices 30. As an example, the program 40 may be configured to analyse the presence or absence of each predetermined parameters in the received data and determine the most likely tool and equipment used amidst a list of given tools and equipment.

In further embodiments, the program 40 is programmed to provide analysis by executing instructions of a deep-learning algorithm or neural networks. In some embodiments, the program 40 is configured to execute a known artificial intelligence platform, such as TensorFlow® from Google®, Azure® from Microsoft®, Watson® from IBM®, and to train such artificial intelligence platform to detect the marks using feedback of a professional quality control operator or other relevant user.

In the training process, the artificial intelligence platform may categorize the data received from the sensors or capturing device 30. The training of the artificial intelligence platform may be performed by a using providing feedback if the analysis outcome of the program 40 is successful or if the outcome is unsuccessful. Generally, the more feedback is provided to the artificial intelligence platform, the more precise the analysis result may be.

The program 40 may be further configured to be executed in an unsupervised learning mode. This mode comprises certain risks as it may originally direct the analysis of the algorithm with less than efficient parameters to analyse, thus taking more time before readjusting the analysis method after receiving sufficient feedback. Nonetheless, this mode may also provide unexpected results by analysing identifying parameters typically not identified as relevant by user operators.

In other embodiments, the algorithm 40 may be configured be trained or to learn in a supervised mode. This mode may provide lower analysis time as the program 40 categorize the data in predetermined categories which are based on relevant data from production lines.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A system for identifying a machine tool having processed a wood piece comprising tool marks in a production line, the system comprising:
   a computerized device executing a program; and
   an information capturing device in communication with the computerized device, the information gathering device having access to wood pieces in the production line and being configured to:
      capture quantifiable and/or qualitative characteristics of the wood pieces of the production line; and
      communicate the said captured characteristics to the computerized device;
   the program being configured to:
      detect marks or patterns on a surface of the wood piece based on the received quantifiable and/or qualitative information; and
      identify a machine tool of the production line having processed the wood piece based on the captured quantifiable and/or qualitative characteristics.

2. The system of claim 1, the program being trained to detect marks or patterns on a wood piece.

3. The system of claim 2, the program being trained using an artificial intelligence algorithm.

4. The system of claim 3, the artificial intelligence algorithm using unsupervised training.

5. The system of claim 3, the artificial intelligence algorithm using supervised training having predetermined categories of characteristics to analyse.

6. The system of claim 1, the information gathering device being selected in one of the followings: a laser scanner, a camera-based scanner, a thermal scanner, and a sound wave-based scanner.

7. The system of claim 1, the identification of the machine tool of the production line having processed the wood piece being based on a single capture of the quantifiable and/or qualitative characteristics of the wood pieces.

8. The system of claim 1, the program being further configured to identify one or more irregularities of the detected marks or patterns, the irregularities being quantifiable and/or qualitative values of characteristics within a predetermined range of values.

9. A computer-implemented method for identifying a machine tool or equipment having processed a wood piece in a production line, the method comprising:
   scanning at least one surface of the wood piece;
   processing each of the scanned surface to identify marks, signs and/or traits present on the at least one scanned face of the wooden piece;
   analyzing characteristics of the processed marks, signs and/or traits; and
   mapping the machine tool or equipment used to process the marks, signs and/or traits based on the analyzed characteristics.

10. The method of claim 9 comprising scanning the at least one surface comprising capturing one or more images and/or geometrical data of one or more faces of the wooden piece.

11. The method of claim 10, the method further comprising categorizing the marks, signs or traits in predetermined categories, the mapping of the machine tool and equipment being based on the categorized marks, signs, or traits.

12. The method of claim 11, the mapping of the machine tool and equipment further being based on the categorized marks, signs or traits being located on the right, left, top or bottom of a central point.

13. The method of claim 11, the method further comprising training a trained artificial intelligence algorithm to categorize the processed marks based on the characteristics of the processed marks.

14. The method of claim 13, the method further comprising training the artificial intelligence algorithm using wood pieced having predefined marks signs or traits.

15. The method of claim 14, the training using an unsupervised mode.

16. The method of claim 14, the training using a supervised mode.

17. The method of claim 16, the supervised artificial mode comprising using an identification table comprising machine tool or equipment information and associated predetermined marks, signs, or traits.

18. The method of claim 17, the method further comprising updating the identification table during the training of the artificial intelligence algorithm.

19. The method of claim 9, the method further comprising:
   calculating a matching probability between the analyzed characteristics and a list of machine tools or equipment present in the production line;
   comparing the calculated matching probability to a predetermined level; and mapping a machine tool or equipment to the wood piece when the calculated matching probability is equal or higher than the predetermined level.

20. The method of claim 9, the scanning of the surface capturing any one of the followings: geometrical data, color data, scalar data, information about the edges of the wood piece and thermographic data.

21. The method of claim 9, the analyzed characteristics comprising any one of the followings: level of curvature, width, depth and length of the mark, sign or trait, distance between different marks, signs or traits and variation of the said identified characteristics.

22. The method of claim 9, wherein the processed marks, signs or traits originate from any one of the followings: a band saw, a conic canter pattern, a cylindrical canter pattern, a circular saw or any combination thereof.

23. The method of claim 9, the method comprising scanning two different wood pieces and matching the two different wood pieces as having been processed by a common machine tool or equipment of the production line.

* * * * *